US009466323B2

(12) United States Patent
Fujii et al.

(10) Patent No.: US 9,466,323 B2
(45) Date of Patent: Oct. 11, 2016

(54) METHOD OF INSPECTING MAGNETIC RECORDING MEDIUM, AND METHOD OF CONTROLLING MOVEMENT OF MAGNETIC HEAD IN MAGNETIC RECORDING/REPRODUCING APPARATUS BY UTILIZING INSPECTING METHOD

(75) Inventors: Jun Fujii, Higashine (JP); Shintaro Tamura, Higashine (JP)

(73) Assignee: SHOWA DENKO K.K., Tokyo (JP)

( * ) Notice: Subject to any disclaimer, the term of this patent is extended or adjusted under 35 U.S.C. 154(b) by 882 days.

(21) Appl. No.: 13/155,987

(22) Filed: Jun. 8, 2011

(65) Prior Publication Data

US 2011/0310508 A1   Dec. 22, 2011

(30) Foreign Application Priority Data

Jun. 9, 2010   (JP) ................................ 2010-132248

(51) Int. Cl.
| | | |
|---|---|---|
| G11B 5/02 | (2006.01) | |
| G11B 5/84 | (2006.01) | |
| G11B 5/024 | (2006.01) | |
| G11B 5/455 | (2006.01) | |
| G11B 20/18 | (2006.01) | |

(52) U.S. Cl.
CPC ............. G11B 5/84 (2013.01); G11B 5/024 (2013.01); G11B 5/455 (2013.01); G11B 20/1816 (2013.01); *G11B 2020/1826* (2013.01); *G11B 2220/2516* (2013.01)

(58) Field of Classification Search
USPC ............................................ 360/57, 70, 75
See application file for complete search history.

(56) References Cited

U.S. PATENT DOCUMENTS

| | | | |
|---|---|---|---|
| 5,532,586 A | 7/1996 | Ishikawa | |
| 6,130,793 A | 10/2000 | Ohmori et al. | |
| 6,292,317 B1 * | 9/2001 | Alexander | ...................... 360/31 |

FOREIGN PATENT DOCUMENTS

| | | |
|---|---|---|
| JP | 64-021778 A | 1/1989 |
| JP | 5-234271 A | 9/1993 |
| JP | 2564491 B2 | 9/1996 |
| JP | 10-105908 A | 4/1998 |
| JP | 10-214421 A | 8/1998 |
| JP | 11-260014 A | 9/1999 |

(Continued)

OTHER PUBLICATIONS

Chinese Office Action dated Sep. 29, 2013 issued in counterpart Application No. 201110207964.X.

(Continued)

*Primary Examiner* — Gustavo Polo
(74) *Attorney, Agent, or Firm* — Sughrue Mion, PLLC

(57) ABSTRACT

A method for moving magnetic heads in a magnetic recording/reproducing apparatus, which comprises the steps of writing high-frequency signals in the magnetic recording/reproducing tracks; and then, either (i) conducting DC erasing or AC erasing to inspect extra pulse signals reproduced from the erased tracks, or (ii) inspecting concurrently occurring signals of missing pulse and spike pulse, which are reproduced from the written signals, whereby minute protrusions on a surface of the tracks were detected. Reading and writing of information are conducted while the magnetic heads are moved in a manner controlled so that reading and writing of information in specific tracks having defects is avoided. This method enhances reliability and life of the magnetic recording/reproducing apparatus.

6 Claims, 6 Drawing Sheets

(56) References Cited

FOREIGN PATENT DOCUMENTS

| | | |
|---|---|---|
| JP | 2003-257016 A | 9/2003 |
| JP | 2008-243310 A | 10/2008 |

OTHER PUBLICATIONS

Japanese Office Action issued in application No. 2010-132248 dated Dec. 6, 2013.

* cited by examiner (a)   (b)

METHOD OF INSPECTING MAGNETIC RECORDING MEDIUM, AND METHOD OF CONTROLLING MOVEMENT OF MAGNETIC HEAD IN MAGNETIC RECORDING/REPRODUCING APPARATUS BY UTILIZING INSPECTING METHOD

BACKGROUND OF THE INVENTION

1. Technical Field

This invention relates to a method of inspecting a magnetic recording medium typified by a hard disk drive, especially to a method which is suitable for certification testing adopted in the inspecting method, and further to a process for producing a magnetic recording medium utilizing the inspection method. Further, the invention relates to a method of controlling the movement of a magnetic head in a magnetic recording/reproducing apparatus, and to a magnetic recording/reproducing apparatus having a magnetic head capable of moving in a controlled manner.

2. Description of the Related Art

Magnetic recording devices typified by a hard disk drive are widely used as external memory units of information processing devices such as computers. In recent years magnetic recording devices have also been used as video recording devices for animated images.

Hard disk drives are ordinarily provided with (i) a shaft around which a magnetic recording medium disk having a doughnut shape with a center opening is rotated or a stack of the superposed magnetic recording medium disks are concentrically and synchronously rotated; (ii) a motor which is coupled via bearings to the shaft for rotating the magnetic recording medium disk or disks around the shaft; (iii) magnetic heads for recording and reproducing information on both surfaces of each magnetic recording disk; (iv) supporting arms to which the magnetic heads are attached; and (v) a head stack assembly which is capable of synchronously moving the supporting arms for moving the magnetic heads to the desired positions on each magnetic recording medium disk. The magnetic heads for reproducing information are usually floating-type heads moving at a certain floating height on the magnetic recording/reproducing medium disk.

Generally magnetic recording mediums provided in a hard disk drive have recording regions in a plurality of concentric tracks each extending in the peripheral direction and arranged in the radial direction, and sub-recording regions called sectors which are sub-divisions of each sector. The recording of information in a magnetic recording disk is generally conducted in track units and sector units.

A magnetic recording medium is ordinarily produced by a process comprising forming a primer layer, a magnetic layer, a protective overcoat and a lubricating layer by sputtering in this order on a substrate made of, for example, an aluminum alloy or glass. The thus-produced magnetic recording medium is subjected to a glide test and a certification test in turn.

The glide test is a test for determining the smoothness of a surface of the disk, i.e., for determining the presence of protrusions on a surface of the disk. If protrusions having a height larger than the floating height of magnetic heads (i.e., a distance between the disk surface and the magnetic heads) are present on the surface of a magnetic recording medium disk, the magnetic heads strike the protrusions at recording and reproducing, which causes damage of the magnetic heads and often gives defective magnetic recording mediums. The glide test is a test for determining the presence of such protrusions on the magnetic recording medium (see, for example, JP H01-260014A).

A certification test is conducted on magnetic recording mediums which have passed the glide test. That is, in the certification test, as with the recording and reproduction of ordinary hard disk drives, prescribed signals are recorded on a magnetic recording medium with magnetic heads, after which the signals are reproduced, and the reproduced signals are examined to determine the electrical characteristics of the magnetic recording mediums and the presence of defects thereof whereby quality of the magnetic recording mediums is evaluated (see, for example, JP2003-257016A).

As a certification test, a method of utilizing signals derived from thermal asperities from an inspection head with a thermally sensitive element has been proposed (see, for example, JP H10-105908A)

Servo information is written by using a device called servo-writer into a magnetic recording medium which has passed the certification test. Then the magnetic recording medium is installed in a hard disk drive. As a magnetic head for use in the hard disk drive, a magneto resistive head (i.e., MR head) has been proposed. With an increase in recording density of the magnetic recording medium, a floating height (i.e., distance between the head and the magnetic recording medium) of the MR head becomes smaller.

Due to the fact that a floating height of the MR head becomes smaller with an increase in recording density of the magnetic recording medium, as mentioned above, the MR head readily impinges against minute protrusions which are inevitably present on a surface of the magnetic recording medium, and thus the head is easily abraded with the result that troubles such as output reduction and deterioration of characteristics are often caused by abrasion of an element of the MR head. Since the minute protrusions have a very small size, a substantial long period of time is required to overcome such troubles and to put into the market a new type of magnetic recording medium having improved characteristics. Further, the troubles caused by abrasion of the head element occurring due to the minute protrusions results in the reduction in the reliability of a hard disk drive.

SUMMARY OF THE INVENTION

In view of the foregoing, an object of the present invention is to provide a method of inspecting a magnetic recording medium, especially to a method which is suitable for certification testing adopted in the inspecting method.

Another object of the invention is to provide a process for producing a magnetic recording medium utilizing the above-mentioned method of inspection.

According to the inspecting method and the production process, a magnetic recording medium having improved reliability can be obtained.

A further object of the present invention is to provide a method of controlling the movement of a magnetic head in a magnetic recording/reproducing apparatus, and to a magnetic recording/reproducing apparatus having a magnetic head capable of moving in a controlled manner.

To solve the above-mentioned problems, the present inventors made extensive researches and found that a magnetic recording medium having minute protrusions on a magnetic recording medium which have a size too small to detect by the conventional glide or certification test, more specifically, a size such that the height is not larger than 15 nm and the width is not larger than 500 nm, gives a magnetic recording/reproducing apparatus exhibiting undesirable abrasion of MR head when it is used for a long period of time; and further found that the presence of minute protrusions having such size can be detected from examination of the signals issuing from the MR head. Based on these findings, the present invention has been completed.

Thus, in accordance with the present invention, there are provided a method of inspecting a magnetic recording medium, a process for producing a magnetic recording medium, a method of controlling the movement of a magnetic head in a magnetic recording/reproducing apparatus, and a magnetic recording/reproducing apparatus, which are described below.

In one aspect of the present invention, there is provided an improvement in a method for inspecting a magnetic recording medium wherein prescribed signals recorded in a disk-shaped magnetic recording medium are reproduced by using magnetic heads while the disk-shaped magnetic recording medium is rotated, and the magnetic recording medium is inspected on the basis of the reproduced signals; said improvement comprising writing high-frequency signals in magnetic recording/reproducing tracks, and then, either (i) conducting DC erasing or AC erasing to inspect extra pulse signals reproduced from the erased tracks, or (ii) inspecting concurrently occurring signals of missing pulse and spike pulse, which are reproduced from the written signals, whereby defects of the magnetic recording/reproducing tracks are detected.

In another aspect of the present invention, there is provided a process for producing a magnetic recording medium comprising a step of detecting defects of magnetic recording/reproducing tracks in a magnetic recording/reproducing apparatus by the above-mentioned improved method for inspecting a magnetic recording medium.

In a further aspect of the present invention, there is provided an improvement in a method for moving magnetic heads in a magnetic recording/reproducing apparatus having a plurality of concentric magnetic recording/reproducing tracks each extending in the peripheral direction, wherein writing of information is conducted by moving magnetic heads while the magnetic recording medium is rotated, said improvement comprising the steps of writing high-frequency signals in the magnetic recording/reproducing tracks; and then, either (i) conducting DC erasing or AC erasing to inspect extra pulse signals reproduced from the erased tracks, or (ii) inspecting concurrently occurring signals of missing pulse and spike pulse, which are reproduced from the written signals; writing the position information of track into a memory; and then, conducting read-and-write of information while the magnetic heads are moved in a manner controlled so that read-and-write of information in specific tracks having defects as detected by the steps of either the above-mentioned (i) or (ii) is avoided on the basis of the position information written in the memory.

In further aspects of the present invention, there are provided a magnetic recording/reproducing apparatus having magnetic heads which are capable of moving by the above-mentioned improved method; and a magnetic recording/reproducing apparatus having a magnetic recording medium produced by the above-mentioned process; a memory having written therein the above-mentioned reproduced signals which are either (i) reproduced from the DC-erased or AC-erased tracks, or (ii) concurrently occurring signals of missing pulse and spike pulse; and magnetic heads for recording and reproducing the magnetic recording medium.

Effects of the Invention

According to the above-mentioned improvement in a method for moving magnetic heads in a magnetic recording/ reproducing apparatus, undesirable abrasion of magnetic head elements occurring due to impingement of the head elements upon minute protrusions on a surface of the magnetic recording medium can be avoided. Thus, the reduction of power output can be minimized.

The magnetic recording/reproducing apparatus of the present invention exhibits minimized abrasion of magnetic head elements and minimized reduction of power output, and therefore, has a long life and high reliability.

According to the improvement of the present invention in a method for inspecting a magnetic recording medium, minute protrusions on a magnetic recording medium which have a size too small to detect by the conventional glide or certification test, can be detected, and thus, there is provided a method for inspecting a magnetic recording medium with enhanced reliability.

The process for producing a magnetic recording medium according to the present invention enables the production of a magnetic recording medium having enhanced reliability as compared with the conventional magnetic recording medium.

A magnetic recording/reproducing apparatus provided with the magnetic recording medium produced by the above-mentioned process of the present invention exhibits minimized abrasion of magnetic head elements and minimized reduction of power output, and therefore, has a long life and high reliability.

BRIEF DESCRIPTION OF THE INVENTION

FIG. 2(2) is a diagrammatic illustration of spike pulse reproduced signals detected in the present invention.

FIG. 2(3) is a diagrammatic illustration of extra pulse reproduced signals detected in the present invention.

FIG. 10 is an illustration of servo pattern used in the present invention wherein FIG. 10(a) is a plan view of whole servo pattern, and FIG. 10(b) is an enlarged plan view illustrating a part of the servo pattern shown in FIG. 10(a).

DETAILED EXPLANATION OF THE INVENTION

The invention will now be described in detail.

In one aspect, the present invention is concerned with a method of moving in a controlled manner magnetic heads in a magnetic recording/reproducing apparatus typified by a hard disk drive.

Figure 1:
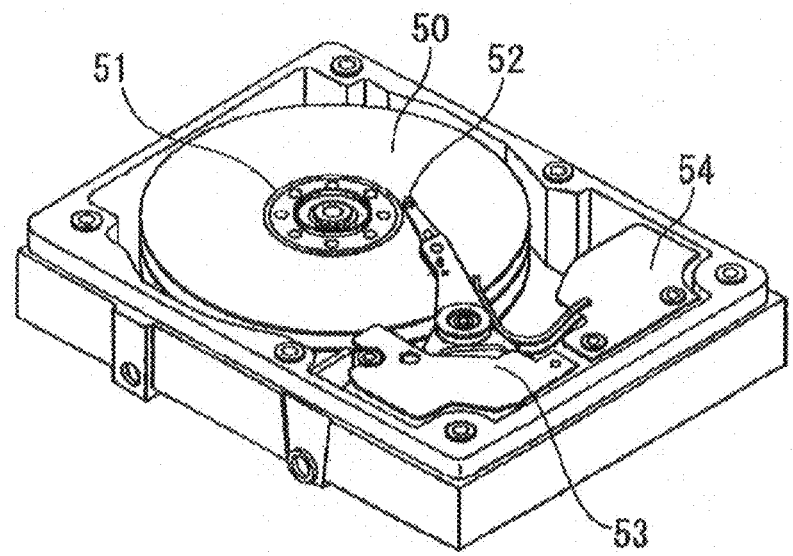
FIG. 1 is a perspective illustration of one example of the magnetic recording/reproducing apparatus of the present invention.

FIG. 1 is a perspective illustration of one example of the magnetic recording/reproducing apparatus of the present invention. The magnetic recording/reproducing apparatus is provided with a magnetic recording medium 50; a medium-driving part 51 for driving the magnetic recording medium 50 to rotate it; a magnetic head 52 for recording and reproducing information in the magnetic recording medium 50; a head-driving part 53 for moving the magnetic head 52 in a relative motion to the magnetic recording medium 50; and a recording-and-reproducing signal treating means 54. The recording-and-reproducing signal treating means 54 has a function of treating data derived from the outside and inputting a recording signal to the magnetic head 52, and treating a reproduced signal from the magnetic head 52 and sending the data to the outside. The magnetic head 52 is a minute part having a size of approximately 20 μm square, which is provided in a part of a head slider having a size of approximately 1 mm square.

To move magnetic heads in a predetermined controlled manner on a magnetic recording medium in a heretofore known magnetic recording/reproducing apparatus, a sector servo system or an index servo system is adopted. More specifically, a track servo system is generally adopted in a heretofore known magnetic recording/reproducing apparatus, wherein a magnetic recording medium 50 having recording/reproducing regions in a plurality of concentric tracks each extending in the peripheral direction, and a plurality of sub-recording regions called sectors in each track, wherein a plurality of servo signals are recorded in each track, is used. The servo signals are reproduced by the magnetic heads 52, and track deviation signals are prepared by treating the reproduced servo signals by a recording-and-reproducing signal treating means 54 in the magnetic recording/reproducing apparatus, and, track servo is effected on the basis of the track deviation signals by a head-driving part 53.

In the method of the present invention for moving in a controlled manner magnetic heads 52 in a magnetic recording/reproducing apparatus, specific magnetic recording/reproducing tracks having minute protrusions on a magnetic recording medium which have a size too small to detect by the conventional glide or certification test, i.e., protrusions having a height of not larger than 15 nm and a width of not larger than 500 nm, are previously recorded by a recording-and-reproducing signal treating means 54 in the magnetic recording/reproducing apparatus. On the basis of the recordation information, the movement of the magnetic heads 52 is controlled so that undesirable impingement of the magnetic heads 52 against the minute protrusions is avoided whereby deterioration of characteristics due to abrasion of the element part of magnetic heads 52 and reduction of output signals can be minimized.

Generally the magnetic recording medium 50 rotates at a high rate of several thousands rpm to ten and several thousands rpm. Therefore, even if protrusions present on the surface of magnetic recording medium have a minute size, when the magnetic heads 52 impinge on the tracks, the magnetic heads 52 are readily damaged to a great extent. In contrast, in the improved method of the present invention, the movement of magnetic heads 52 is controlled so that undesirable impingement of the magnetic heads 52 against the minute protrusions is avoided. Thus, the damage of magnetic heads 52 is greatly reduced.

In the method of the present invention, defects, i.e., minute protrusions on the magnetic recording/reproducing tracks are detected by a first improved method. The first improved method comprises the steps of writing high-frequency signals in the magnetic recording/reproducing tracks; and then, conducting DC erasing or AC erasing to inspect extra pulse signals reproduced from the erased tracks.

Alternatively, minute protrusions on the magnetic recording/reproducing tracks are detected by a second improved method. The second improved method comprises the steps of writing high-frequency signals in the magnetic recording/reproducing tracks; and then, inspecting concurrently occurring signals of missing pulse and spike pulse, which are reproduced from the written signals.

The magnetic recording/reproducing tracks from which extra pulse reproduced signals have been detected or the magnetic recording/reproducing tracks from which concurrently occurring signals of missing pulse and spike pulse have been detected, are recorded.

The recordation of the magnetic recording/reproducing tracks can be effected by writing thereof in a memory installed in the magnetic recording medium or in a memory independent from the magnetic recording medium.

Figure 2:
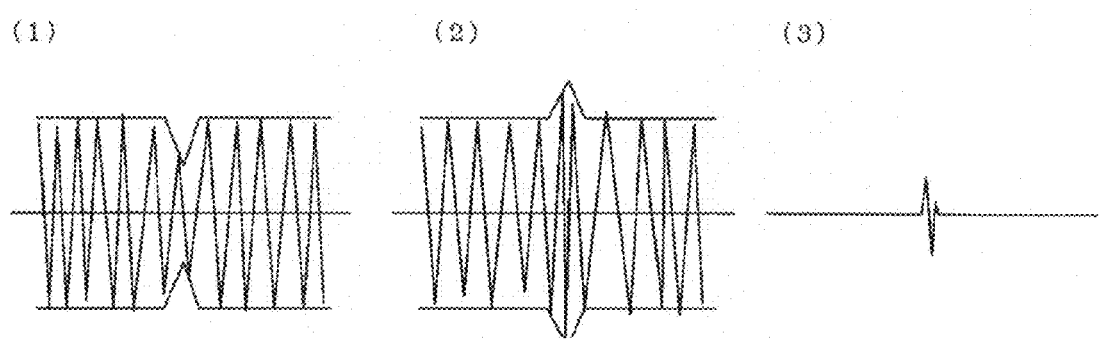
FIG. 2(1) is a diagrammatic illustration of missing pulse reproduced signals detected in the present invention.

The reproduced signals from the magnetic heads 52 used for detecting the magnetic recording/reproducing tracks in the present invention are diagrammatically illustrated in FIG. 2, wherein missing pulse reproduced signals are illustrated in (1), spike pulse reproduced signals are illustrated in (2), and extra pulse reproduced signals are illustrated in (3).

Concurrently occurring reproduced signals of missing pulse and spike pulse refer to reproduced signals comprising a combination of missing pulse reproduced signals in (1) with spike pulse reproduced signals in (2). The concurrently occurring reproduced signals of missing pulse and spike pulse includes (i) a first type where missing pulse reproduced signals are followed by spike pulse reproduced signals, (ii) a second type where spike pulse reproduced signals are followed by missing pulse reproduced signals, (iii) a third type wherein spike pulse reproduced signals occur intervening between missing pulse reproduced signals, and (iii) a fourth type wherein missing pulse reproduced signals occur intervening between spike pulse reproduced signals. The third type reproduced signals and the fourth type reproduced signals can be defined as continuous signals of missing pulse/spike pulse/missing pulse, and continuous signals of missing pulse/spike pulse/missing pulse, and continuous signals of spike pulse/missing pulse/spike pulse, respectively. These continuous signals are included in the concurrently occurring reproduced signals of missing pulse and spike pulse, as used in the present invention.

In the first method for detecting minute protrusions on the magnetic recording/reproducing tracks, high-frequency signals are written in the magnetic recording/reproducing tracks; and then, either DC erasing or AC erasing is conducted. When the magnetic recording/reproducing tracks are reproduced by magnetic heads 52, extra pulse signals which are un-erased signals having a large amplitude as illustrated in FIG. 2(3), occur in some tracks in addition to DC erased signals or AC erased signals which have a low amplitude. The magnetic recording/reproducing tracks having such extra pulse signals are detected and recorded in a memory.

In the method of moving magnetic heads in a magnetic recording/reproducing apparatus, reading and writing of information is carried out while the magnetic heads are moved in a manner controlled so that reading and writing of information in specific tracks having detected defects are avoided.

Figure 3:
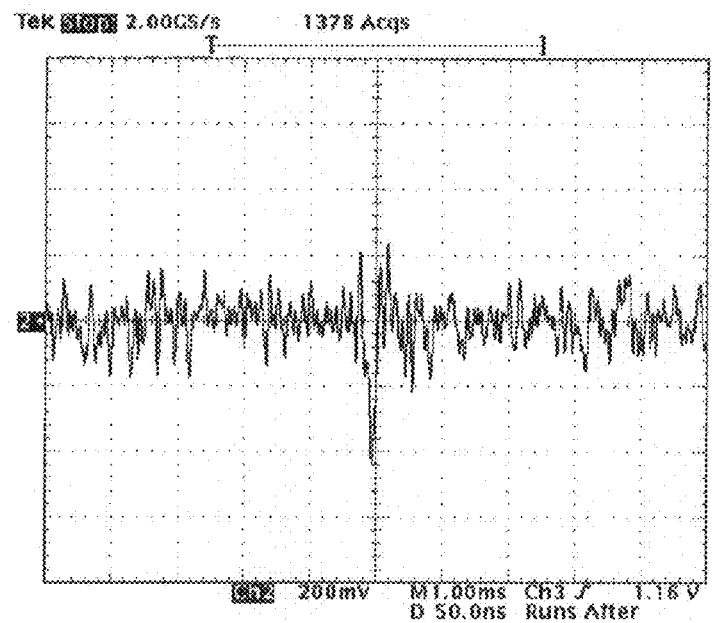
FIG. 3 is an illustration of extra pulse reproduced signals as observed after DC erasing in the improved method for inspecting a magnetic recording medium according to the present invention.

FIG. 3 is an illustration of one example in which extra pulse reproduced signals, namely, un-erased signals having a large amplitude occur in addition to DC erased signals having a small amplitude as observed after DC erasing in the improved method for inspecting a magnetic recording medium according to the present invention.

Figure 4:
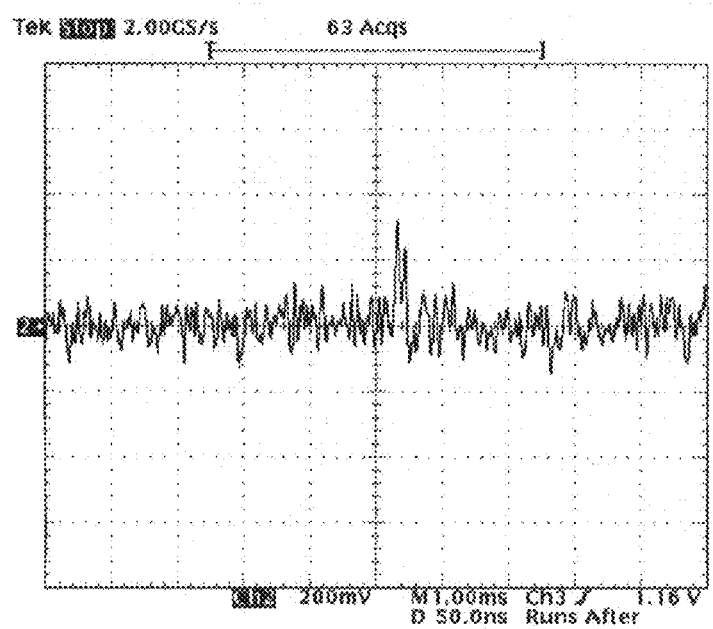
FIG. 4 is an illustration of extra pulse reproduced signals as observed after AC erasing in the improved method for inspecting a magnetic recording medium according to the present invention.

FIG. 4 is an illustration of one example in which extra pulse reproduced signals, namely, un-erased signals having a large amplitude occur in addition to AC erased signals having a small amplitude as observed after AC erasing in the improved method for inspecting a magnetic recording medium according to the present invention.

In the second method for detecting minute protrusions on the magnetic recording/reproducing tracks, high-frequency signals are written in the magnetic recording/reproducing tracks. When the magnetic recording/reproducing tracks are reproduced by magnetic heads 52, reproduced signals comprising a combination of missing pulse reproduced signals with spike pulse reproduced signals concurrently occur in some tracks within high frequency signals. The magnetic recording/reproducing tracks having such missing pulse/spike pulse reproduced signals are detected and recorded in a memory.

In the method of moving magnetic heads in a magnetic recording/reproducing apparatus, reading and writing of information is carried out while the magnetic heads are moved in a manner controlled so that reading and writing of information in specific tracks having detected defects are avoided.

Figure 5:
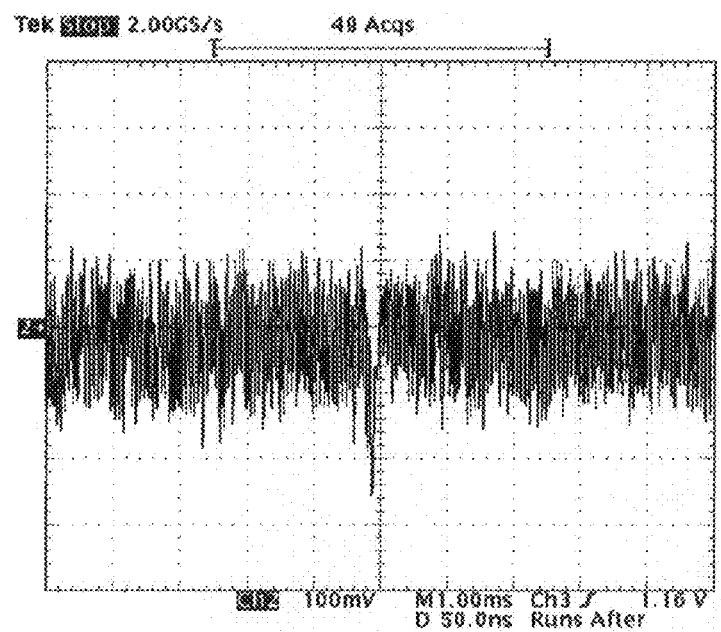
FIG. 5 is an illustration of concurrently occurring signals of missing pulse and spike pulse, which are reproduced from the written high-frequency signals in the improved method for inspecting a magnetic recording medium according to the present invention.

FIG. 5 is an illustration of one example in which reproduced signals comprising a combination of missing pulse reproduced signals with spike pulse reproduced signals concurrently occurred in some tracks within high frequency signals.

Figure 6:
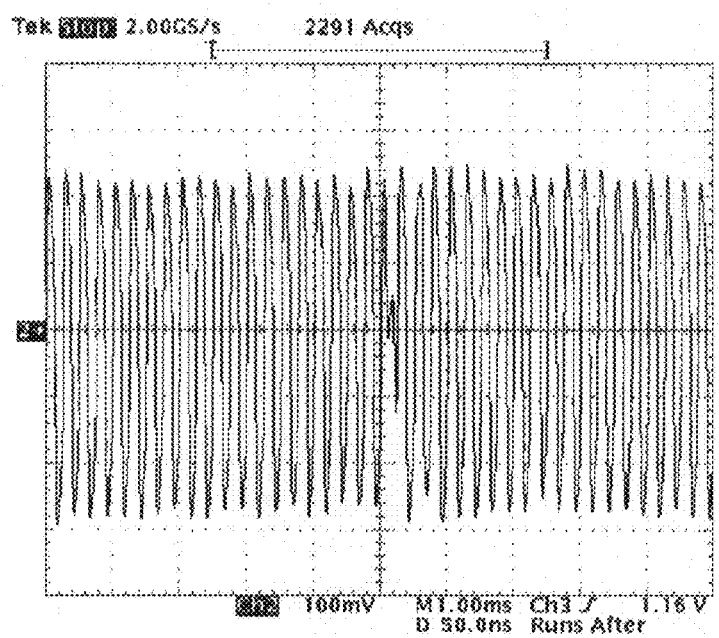
FIG. 6 is an illustration, shown for comparison purpose, of missing pulse reproduced signals as observed from the written low-frequency signals.

FIG. 6 is an illustration, shown for comparison purpose, of missing pulse reproduced signals as observed from the written low-frequency signals. Namely, low-frequency signals are written in the same magnetic recording/reproducing tracks as in FIG. 5, and, when the magnetic recording/reproducing tracks are reproduced by magnetic heads, missing pulse reproduced signals as illustrated in FIG. 6 are observed. In the reproduced signals illustrated in FIG. 6, missing pulse is observed within low-frequency signals but spike pulse does not occur concurrently with the missing pulse.

By the term "AC erasing" as used in the present invention, we mean erasing in a frequency range of 1,000 kFCl (0.025 μm/bit) to 3,000 kFCl (0.008 μm/bit), preferably with a frequency of 2,000 kFCl (0.013 μm/bit).

By the term "writing high frequency signals" as used in the present invention, we mean writing of signals with a frequency in the range of 600 kFCl (0.042 μm/bit) to 1,000 kFCl (0.025 μm/bit), preferably with a frequency of 800 kFCl (0.032 μm/bit). In contrast, by the term "writing low frequency signals," we mean writing of signals with a frequency in the range of 100 kFCl (0.254 μm/bit) to 300 kFCl (0.085 μm/bit), preferably with a frequency of 200 kFCl (0.127 μm/bit).

Figure 7:
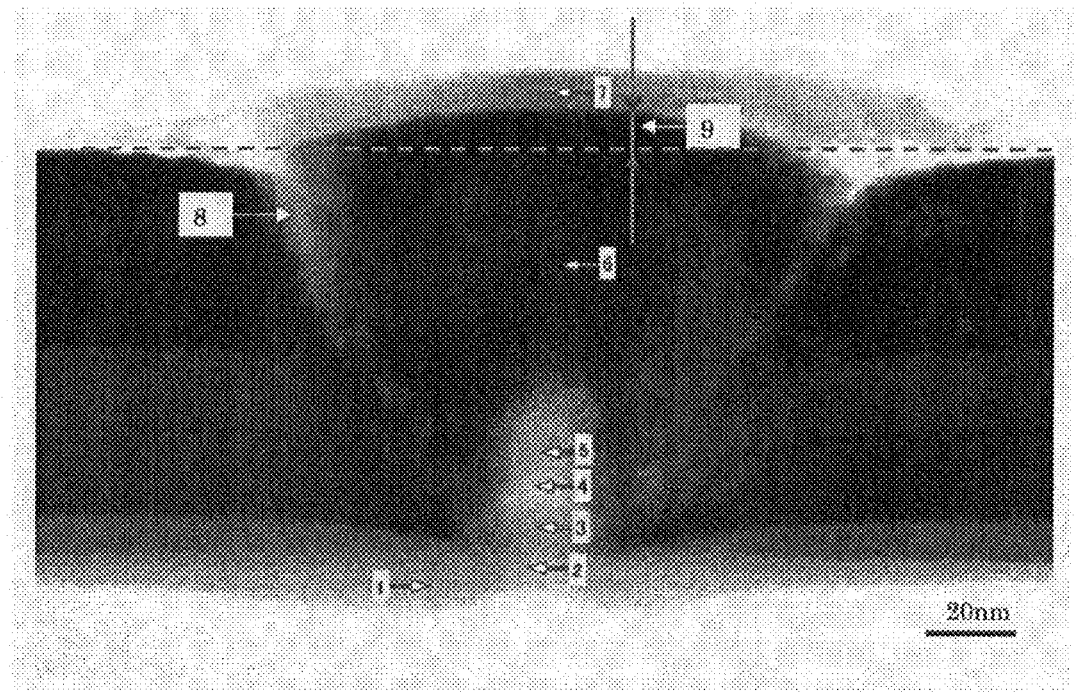
FIG. 7 is an enlarged sectional TEM photographic view showing an example of a minute protrusion defect as detectable in the improved inspection method according to the present invention.

FIG. 7 is an enlarged sectional TEM photographic view showing an example of a minute protrusion defect, which are difficult or impossible to detect by the conventional glide test and certification test, but are detectable in the improved inspection method according to the present invention.

The minute protrusion defect is believed by the present inventors to be formed according to the following process.

First, thin films are deposited on nuclei of minute foreign matters (arrows 3, 4 and 5) deposited before or in the midway of forming a magnetic thin film on a surface (arrow 2) of a substrate. The deposited thin films form bumps. In the boundary between each bump and a flat region having no bumps (arrow 6), a crater (arrow 8) is formed by the shadow effect as observed during formation of thin films on nuclei of minute foreign matters. The bumps formed from thin films have a height which is proportional to a height of nuclei of minute foreign matters. Summits of the bumps are removed by a vanishing step. The thus-formed protrusion defect (arrow 9) has a height of not higher than 15 nm. The minute protrusion defect having such a low height is difficult or impossible to detect by the conventional glide test and certification test. The minute protrusion defect has a width of approximately 500 nm at maximum, and therefore, when a magnetic head impinges on the protrusion defect, it gives a large damage to a disk.

In the present invention, a spike pulse reproduced signal or an extra-pulse reproduced signal is utilized for detecting the above-mentioned minute protrusion defect. The present inventors elucidated that these reproduced signals are influenced by magnetic field occurring due to the residual magnetization wherein the structure of magnetic thin films is disturbed on a slope of the crater (arrow 8) or the bump. The missing pulse reproduced signal occur due to the vanishing of the summit of the bump, i.e., abrasion of the magnetic thin films.

The method for inspecting a magnetic recording medium according to the present invention wherein prescribed signals recorded in a disk-shaped magnetic recording medium are reproduced by using magnetic heads while the disk-shaped magnetic recording medium is rotated, and the magnetic recording medium is inspected on the basis of the reproduced signals by a certification testing method, is characterized in that high-frequency signals are written in magnetic recording/reproducing tracks, and then, either (i) DC erasing or AC erasing is conducted to inspect extra pulse signals reproduced from the erased tracks, or (ii) inspection of concurrently occurring signals of missing pulse and spike pulse, which are reproduced from the written signals, is conducted, whereby defects of the tracks are detected.

Figure 8:
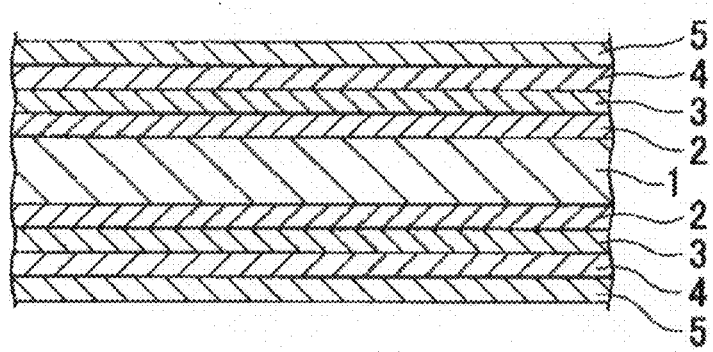
FIG. 8 is a sectional view illustrating the multilayer structure of an example of a magnetic recording medium provided in a magnetic recording/reproducing apparatus of the present invention.

FIG. 8 is a sectional view illustrating the multilayer structure of an example of a magnetic recording medium to be tested by the certification testing method according to the present invention. The magnetic recording medium shown in FIG. 8 has a disk shape and its multilayer structure comprises a non-magnetic substrate 1 on both sides of which a non-magnetic primer layer 2, a magnetic layer 3, a protective overcoat 4 and a liquid lubricating layer 5 are formed in this order. The magnetic recording medium to be tested by the method of the present invention may be either a both side-stacked type medium as illustrated in FIG. 8, or a one side-stacked type medium in which a non-magnetic primer layer, a magnetic layer, a protective overcoat and a liquid lubricating layer are formed in turn on one side of a non-magnetic substrate.

A glide test is preferably conducted before the certification test for the magnetic recording medium illustrated in FIG. 8 as described below. In the glide test, a surface of the magnetic recording medium is scanned while a testing head is floated over the rotated magnetic recording medium, whereby minute protrusions are detected by a signal from the testing head. By conducting the glide test before the certification test, damage of the testing head can be avoided in the step of the certification test.

As examples of the testing head used for the glide test, there can be mentioned a head provided with a heat-sensitive element and a head provided with an AE sensor or a piezosensor. In the case when the head provided with a heat-sensitive element is used, when the testing head is contacted with minute protrusions on the magnetic recording medium rotating at a high speed, heat is instantaneously generated on the testing head, and the heat is detected by the heat-sensitive element to give a signal. The signal enables the detection of minute protrusions in the glide test. The floating height of the testing head adopted in the glide test is preferably lower than the floating height of a magnetic recording/reproducing head conventionally adopted in a hard disk drive.

Figure 9:
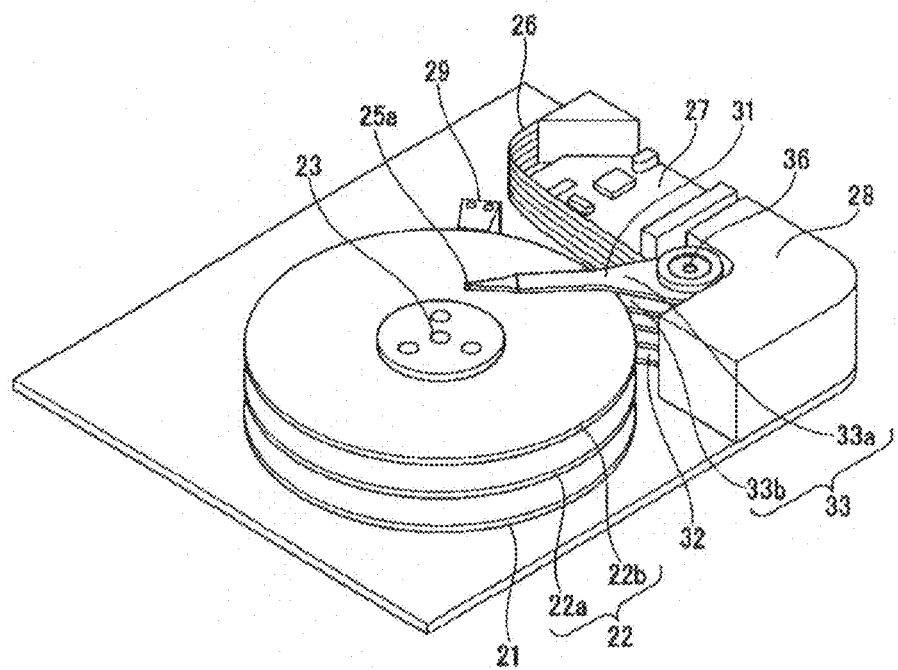
FIG. 9 is a schematic illustration of one example of the inspection apparatus used in the improved method for inspecting a magnetic recording medium according to the present invention.
Figure 10:
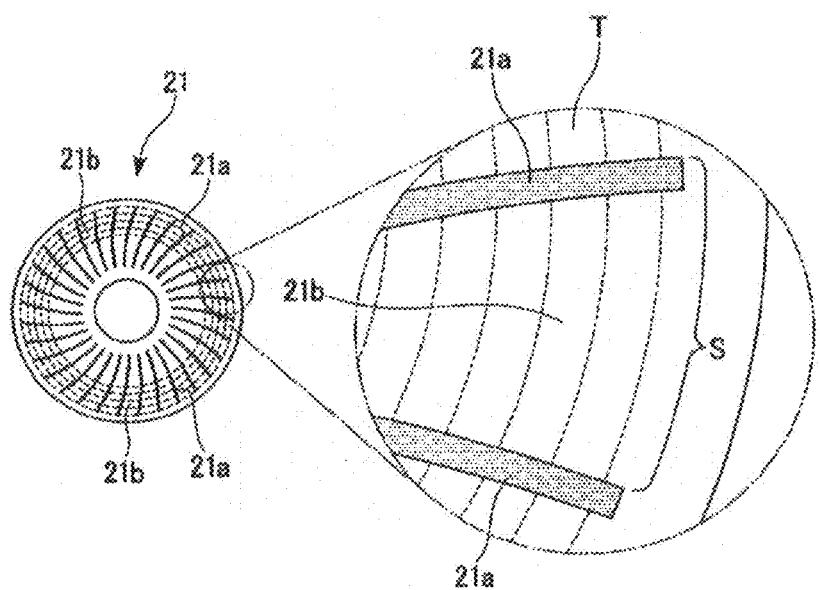

With reference to FIG. 9 and FIG. 10, procedures for the certification test for a magnetic recording medium will be described.

FIG. 9 is a schematic illustration of an example of the certification testing apparatus used in the certification test for a magnetic recording medium according to the present invention.

In the example described in the following, the certification test for a magnetic recording medium disk to be tested is continuously carried on a disk comprised of three magnetic recording mediums having a multilayer structure as illustrated in FIG. 8.

In FIG. 9, reference numerals 21 and 22 indicate magnetic recording mediums to be tested. In the example illustrated in FIG. 4, three magnetic recording mediums 21, 22a and 22b are tested. The test for each of the three mediums 21, 22a and 22b is repeatedly carried out in a continuous manner. Therefore, the following explanation is made mainly only on the magnetic recording medium 21.

The three magnetic recording mediums 21, 22a and 22b to be tested have a disk form and each of these mediums has a multilayer structure as illustrated in FIG. 8. The three disks 21, 22a and 22b are superposed coaxially in the perpendicular direction to the plane, and are coaxially and synchronously rotated by a rotation mechanism 23 provided with a spindle motor, as illustrated in FIG. 3.

Reference numerals 32 and 33 (33a and 33b) indicate supporting arms which correspond to disks to be tested 21 and 22 (22a and 22b), respectively. The supporting arms are axially supported by a pivot 36. Reference numeral 31 indicate a head stack assembly. A magnetic head 25a is provided at an end of the supporting arm 33a. Reference numerals 23, 26, 27, 28 and 29 indicate a rotation mechanism, a flexible printing board, a signal treating circuit, a head driving apparatus and a save area, respectively.

FIG. 10 is illustrated to explain tracks and sectors in the magnetic recording medium disks to be tested. FIG. 10(*a*) is a plan view of whole survo pattern, and FIG. 10(*b*) is an enlarged plan view illustrating a part of the servo pattern shown in FIG. 10(*a*). In FIG. 10, T indicates a track and S indicates a sector.

As illustrated in FIG. 10, a medium disk 21 has servo information regions 21a each continuously extending in radial direction from the disk center which are formed upon writing by a servo writer or in a magnetic transfer step. A Beta information region 21b is formed between adjacent servo information regions 21. The servo information regions 21a defines recording regions wherein servo informations each comprising a track location information and a sector location information are recorded in the respective recording regions.

In the certification testing apparatus as shown in FIG. 9, after completion of the certification test of the medium disks 21, 22a and 22b, these medium disks can be exchanged with medium disks to be newly tested. The certification testing apparatus as shown in FIG. 9 has a save area (i.e., place of refuge) for a magnetic head 25a, therefore, when the medium disks 21, 22a and 22b are exchanged, it can be avoided that the supporting arms 32 and 33 constituting the head stack assembly 31 prevent the exchange of the medium disks 21, 22a and 22b, by transferring the magnetic head 25a to the save area 29.

The method for inspecting a magnetic recording medium according to the present invention is characterized in that, high frequency signals are written by a magnetic head in tracks of a magnetic recording medium 21 to be tested, by using the certification testing apparatus illustrated in FIG. 8, and then, either (i) conducting DC erasing or AC erasing to inspect extra pulse signals reproduced from the erased tracks, or (ii) inspecting concurrently occurring signals of missing pulse and spike pulse, which are reproduced from the written signals, whereby surface defects of the tracks of the medium 21 are detected.

The specific procedures adopted for the inspecting method of the present invention are mentioned above.

According to the method for inspecting a magnetic recording medium of the present invention, sectors and tracks with minute protrusions which have a size too small to detect by the conventional glide or certification test can be detected. Based on the results of detection, magnetic recording mediums can be sorted into acceptable mediums and rejected mediums. The rejected mediums can be subjected to varnishing and then the varnished mediums can be again tested by the inspecting method of the present invention.

By registering separately information of defective sectors and defective tracks of each of the tested magnetic recording mediums, a magnetic recording/reproducing apparatus provided with each tested magnetic recording medium having defective sectors and/or defective sectors can be operated for recordation and/or reproduction so as to avoid recordation and/or reproduction in the defective sectors and/or defective sectors.

In the specific example described above, the certification test is conducted for a magnetic recording medium disk having a multilayer structure comprised of three magnetic recording mediums. However, the method of inspecting a magnetic recording medium according to the present invention is not limited to the specific example.

EXAMPLES

Now the present invention will be specifically described by the following examples, but should not construed to be limited thereto.

Example 1

Magnetic recording mediums having a multilayer structure with an outer diameter of 2.5 inches as illustrated in FIG. 8 were prepared. A glide test and a certification test were carried out on the magnetic recording mediums.

Glide Test

A glide test was conducted at a mechanical spacing of 0.25 μ-inch between a testing head and a surface of each magnetic recording medium. In the case when a signal occurring due to collision of the testing head with minute protrusions on the surface of the magnetic recording mediums was detected from the testing head, the magnetic recording medium was rated as defective. In contrast, in the case when such a signal was not detected from the testing head, the magnetic recording medium was rated as acceptable.

Step of writing Servo Information

Servo information was written by using a servo writer in the magnetic recording mediums which have passed the glide test. A servo pattern was radial pattern extending from the center of each magnetic recording medium. Track pitch was 0.1 μm and 100,000 tracks were provided per one surface of the medium. 256 servo sectors were provided in each circle of track.

Certification Test

A certification test was carried out by using the apparatus as illustrated in FIG. 9. A TuMr head used for a single hard disk drive for 2.5 inch 120 G-bite was used as a testing head. A head stack assembly conventionally used for hard disk drives was used as a head stack assembly.

The certification test was carried out one by one by using a magnetic head while three superposed disks to be tested were coaxially and synchronously rotated at 3600 rpm. In the certification test, a high frequency signal of 800 kFCl was written in all of the tracks and the sectors, and then, output signals from all of the tracks and the sectors were analyzed. Thus, concurrently occurring signals of missing pulse and spike pulse were detected, wherein the missing pulse had a width of 0.5 μm in the circular direction, and the spike pulse had a magnitude of at least 1.4 times of the average amplitude of the written high frequency signal. Tracks wherein the above mentioned concurrently occurring signals of missing pulse and spike pulse were detected were recorded as defective tracks.

Production of Magnetic Recording/Reproducing Apparatus

A magnetic recording/reproducing apparatus comprising a combination of the magnetic recording medium having passed a certification test as mentioned above with a head stack assembly was produced. The magnet circle is recording medium provided in the apparatus was single.

Example 2

Figure 11:
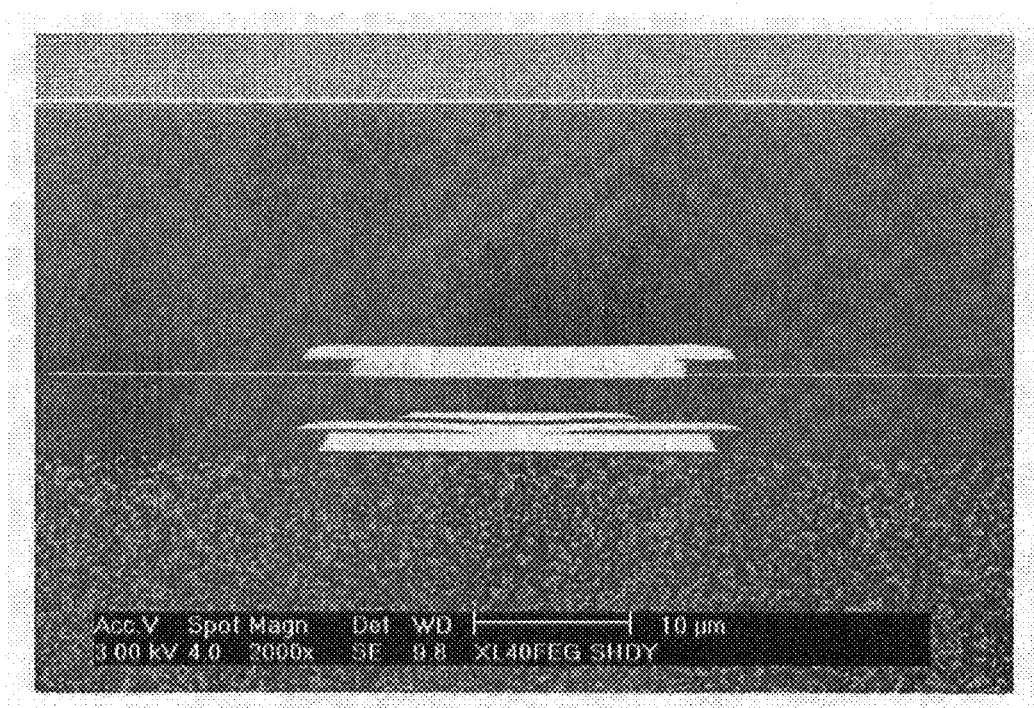
FIG. 11 is an enlarged sectional photographic view showing an abrasion state of a magnetic head element as used in a working example of the improved inspection method according to the present invention.

The produced magnetic recording/reproducing apparatus was subjected to a seek test for 100 hours. In the seek test, seeking using a magnetic head was conducted over the tracks except for (i) the defective tracks recorded in the certification test and (ii) tracks located within a circular region having width of 50 μm with a center of the recorded defective tracks. FIG. 11 is a photographic view showing an abrasion state of a magnetic head element after the use in the seek test. In FIG. 11, an upper white image indicates a writing element and a lower white image indicates a reading element. In the magnetic head element used in Example 2, abrasion was not found.

Comparative Example

Figure 12:
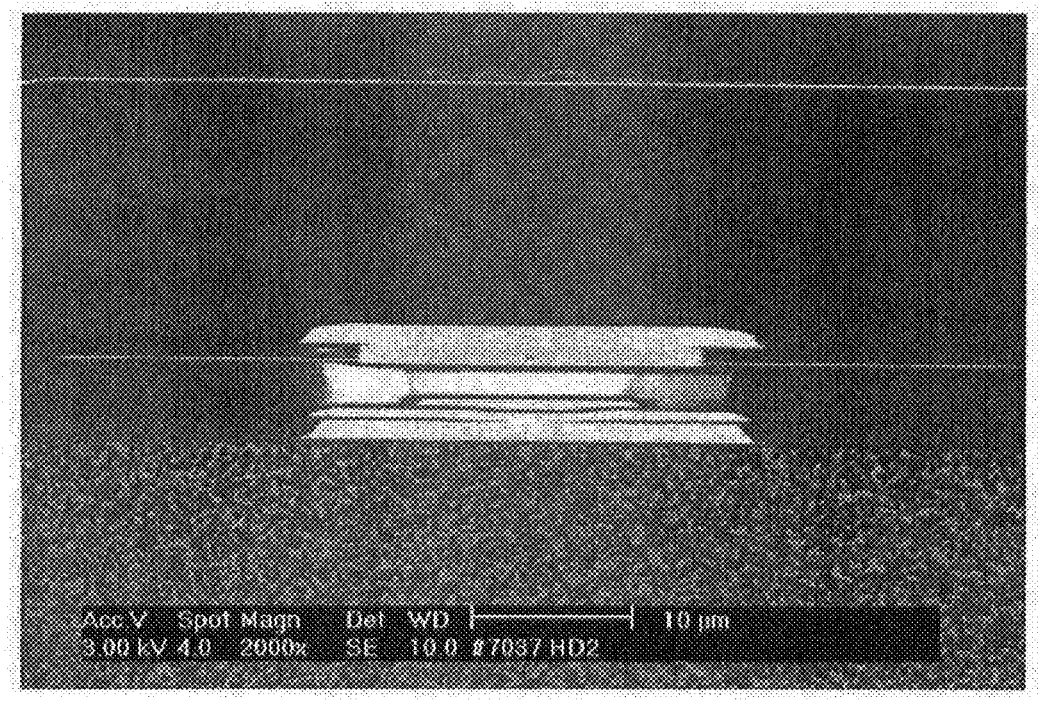
FIG. 12 is an enlarged sectional photographic view showing an abrasion state of a magnetic head element as used in a comparative example, shown for a comparison purpose.

The same produced magnetic recording/reproducing apparatus as used in Example 2 was subjected to a seek test for 100 hours. In the comparative seek test, seeking using a magnetic head was conducted over only the defective tracks recorded in the certification test. FIG. 12 is a photographic view showing an abrasion state of a magnetic head element after the use in the Comparative seek test. As seen from the comparison with FIG. 11, it was observed that a protective carbon overcoat between a writing element and a reading element was abraded and an alumina ceramics part under the overcoat was exposed.

What is claimed is:

1. An improvement in a method for inspecting a magnetic recording medium wherein prescribed signals recorded in a disk-shaped magnetic recording medium are reproduced by using magnetic heads while the disk-shaped magnetic recording medium is rotated, and the magnetic recording medium is inspected on the basis of the reproduced signals;

said improvement comprising writing high-frequency signals in magnetic recording/reproducing tracks, and then, either (i) conducting DC erasing or AC erasing to inspect extra pulse signals reproduced from the erased tracks, or (ii) inspecting concurrently occurring signals of missing pulse and spike pulse, which are reproduced from the written signals, whereby defects of the tracks are detected.

2. A process for producing a magnetic recording medium comprising a step of detecting defects of magnetic recording/reproducing tracks in a magnetic recording/reproducing apparatus; said step comprising the improvement in the method for inspecting a magnetic recording medium as claimed in claim 1.

3. An improvement in a method for moving magnetic heads in a magnetic recording/reproducing apparatus having a plurality of concentric magnetic recording/reproducing tracks each extending in the peripheral direction, wherein reading and writing of information is conducted by moving magnetic heads while the magnetic recording medium is rotated;

said improvement comprising the steps of writing high-frequency signals in the magnetic recording/reproducing tracks; and then, either (i) conducting DC erasing or AC erasing to inspect extra pulse signals reproduced from the erased tracks, or (ii) inspecting concurrently occurring signals of missing pulse and spike pulse, which are reproduced from the written signals; writing the position information of track into a memory; and then, conducting reading and writing of information while the magnetic heads are moved in a manner controlled so that reading and writing of information in specific tracks having defects as detected by the step of either (i) or (ii) is avoided on the basis of the position information written in the memory.

4. A magnetic recording/reproducing apparatus having magnetic heads which are capable of moving by the improved method as claimed in claim 3.

5. A magnetic recording/reproducing apparatus comprising a magnetic recording medium produced by the process as claimed in claim 2; a memory having written therein the reproduced signals which indicate specific magnetic recording/reproducing tracks having defects are either (i) reproduced from the DC-erased or AC-erased tracks, or (ii) concurrently occurring signals of missing pulse and spike pulse; and magnetic heads for recording and reproducing the magnetic recording medium.

6. The magnetic recording/reproducing apparatus according to claim 5, wherein said memory having written therein the reproduced signals which indicate specific magnetic recording/reproducing tracks having defects is a memory installed in the magnetic recording medium, or is a memory independent from the magnetic recording medium.

* * * * *